United States Patent [19]

Kristinsson et al.

[11] 4,389,750
[45] Jun. 28, 1983

[54] DEVICE FOR THE BEHEADING OF FISH

[75] Inventors: Sigurdur Kristinsson, Saudarkrokur; Örn Johannesson, Reykjavik, both of Iceland

[73] Assignee: Nordischer Maschinenbau Rud. Baader GmbH & Co KG, Lubeck, Fed. Rep. of Germany

[21] Appl. No.: 272,540

[22] Filed: Jun. 11, 1981

[51] Int. Cl.³ .............................................. A22C 25/14
[52] U.S. Cl. .......................................... 17/63; 17/60
[58] Field of Search ...................................... 17/63, 60

[56] References Cited

FOREIGN PATENT DOCUMENTS

| 868655 | 4/1971 | Canada | 17/63 |
| 1432560 | 2/1966 | France | 17/63 |

*Primary Examiner*—Willie G. Abercrombie
*Attorney, Agent, or Firm*—Edward F. Levy

[57] ABSTRACT

An apparatus is disclosed for mechanically decapitating fish, in which fish lying on one of their sides are conveyed transversely and decapitated by a wedge-shaped cut by means of a decapitating tool. In order to perform an exact symmetrical and economical decapitating cut independently of the respective size of the fish to be processed the decapitating tool is mounted pivotably about a pivot axle extending in the plane of symmetry of the same and parallel to the conveying direction of the fish. The adaptation proceeds automatically through a pair of centrally synchronized feeler rails which are borne on the housing carrying the knives of the beheading tool.

4 Claims, 2 Drawing Figures

DEVICE FOR THE BEHEADING OF FISH

BACKGROUND OF THE INVENTION

1. Field of the Invention

The invention concerns an apparatus for mechanically decapitating fish which are conveyed transversely to their longitudinal axis and lying on one of their sides in receiving troughs of a trough chain, by means of a beheading or decapitating tool which is arranged closely beside one end of the receiving troughs and consists of a pair of rotatingly driven circular knives which are arranged symmetrically to each other, include an angle with each other and are aligned by their plane of symmetry to be nearly parallel to the plane of a bottom surface of the receiving troughs, as well as a pair of feeler rails which are arranged symmetrically to the plane of symmetry of the circular knives and displaceable synchronously by the fish against the force of a spring.

2. Description of the Prior Art

A beheading apparatus of that kind is known from German Letters Patent No. 11 28 617. In this device, a co-ordination of the planes of symmetry of the fish, of the feeler rails termed as gill guides in that publication, and the beheading knives takes place independently of the thickness of the respective fish thereby, that at least the smaller fish are raised from their support by means of the lower of the two gill guides in the region of the beheading cut to be performed. This is achieved in consequence of the synchronisation of the gill guides in the alignment of their plane of symmetry in that of the beheading knives through the lower guide. Each trough is provided with a conveying shoulder which supports the fish at its spine and is constructed to be fitting this. During the positioning of the fish by means of the gill guides, the fish, by reason of the frictional resistance at the guide edges of the gill guides and after engagement of the beheading knives additionally through their cutting resistance, is pressed against the conveying shoulder and is located there in respect of its height position in consequence of the prismatic construction of the conveying shoulder. By reason of this location of the spine, the fish in the course of its alignment tends to rotate, for which its back line forms the rotational axis. Beyond that, the retention of the fish merely in the gill guides has the effect that the remaining fish body sags downwardly. An exact symmetrical cut guidance of the wedge-shaped decapitating cut is therefore not to be attained for most of the fish sizes to be processed. This, however, is a pre-requisite for an economical cut guidance, for which it should nevertheless be made certain that undesired components, such as bone remnants, which could obstruct further mechanical processing or the removal of which requires additional work effort, are cut off with the head.

From the DD-PS No. 128 669 there is known a further decapitating apparatus, in which the fish, seized conveyingly by means of entraining members, slide transversely to their longitudinal axis on a support surface. In the region of decapitating knives performing a wedge-shaped cut, the fish runs between a pair of synchronised head guides. Support elements engaging through the support surface are connected with the lower one of the head guides. This has the effect that the fish is aligned by its plane of symmetry to that of the wedge-cut beheading knives in correspondence with the respective setting of the head guides determined by the thickness of the fish. Although the disadvantageous sagging of the fish body is thereby avoided, the remaining recited defects are, however, also to be found in this known device.

3. Object of the Invention

It is an essential object of the invention to provide a decapitating apparatus for fish, which makes a wedge-shaped decapitating cut extending exactly symmetrically to the plane of symmetry of the fish and thus an extremely economical decapitation possible.

SUMMARY OF THE INVENTION

According to the invention this object is achieved by an apparatus for mechanically decapitating fish which are conveyed transversely to their longitudinal axis and lying on one of their sides in receiving troughs each having two opposing lateral end portions and a bottom surface, of a trough chain, by means of a decapitating tool which is arranged closely beside one of said lateral ends of the receiving troughs and comprises a pair of rotatingly driven circular knives which are arranged symmetrically to each other, include an angle with each other and are aligned by their plane of symmetry to be nearly parallel to the plane of a bottom surface of the receiving troughs, a pair of feeler rails being arranged symmetrically to the plane of symmetry of the circular knives and displaceable synchronously by the fish against the force of a spring, in which apparatus the decapitating tool is mounted displaceably in height together with the pair of feeler rails in respect of the position of the plane of symmetry of the circular knives relative to the plane of the bottom surfaces of the receiving troughs.

By this association of the feeler rails with the decapitating tool it is achieved in a simple manner to bring the planes of symmetry of the fish and of the decapitating tool as well as the feeler rails into congruency at least at the cutting location, i.e. to attain a wedge-shaped decapitating cut extending exactly centrally in the fish without the fish changing its position in the receiving troughs.

According to a preferred embodiment of the apparatus according to the invention, the decapitating tool can be mounted to be pivotable about a pivot axle which is disposed essentially in the plane of symmetry of the circular knives and arranged essentially parallel to the plane of the same. This construction makes an automatic adaptation of the decapitating tool to the respective fish size with very little stressing of the fish body through the feeler forces of the pair of feeler rails possible.

In order to secure a largely symmetrical course of the wedge-shaped decapitating cut over the entire fish cross-section, it is advantageous to arrange the bottom surfaces of the receiving troughs in such a manner that they are inclined to be rising in the conveying direction of the troughs relative to the conveying plane. By making the spacing between the decapitating tool and the respective end of the receiving troughs settable, apart from the possibility of the setting of the device to optimum yield, it is also made possible, if desired, for example, to leave the collar bones on the rump or to cut them off with the head.

BRIEF DESCRIPTION OF THE DRAWINGS

Other and further objects of the present invention will be apparent from the following description and claims and are illustrated in the accompanying schematic drawings, which, by way of illustration, show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the suspended claims.

In the drawings

DESCRIPTION OF THE PREFERRED EMBODIMENT

Figure 1:
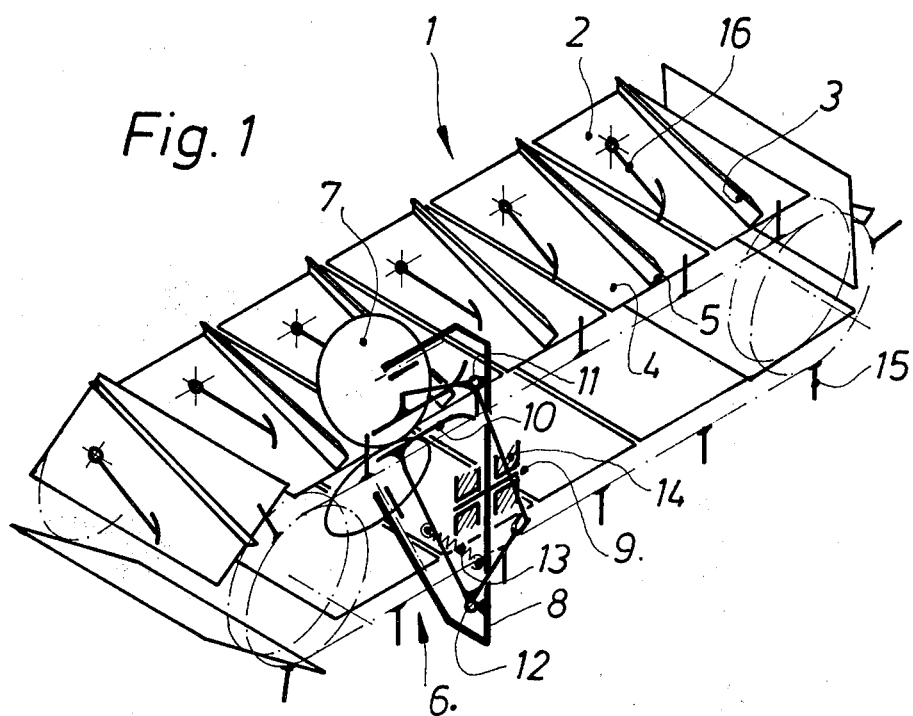
FIG. 1 is an axonometric representation of an apparatus according to the invention.

An endless, rotatingly driven trough chain 1 of individual receiving troughs 2 for transporting fish transversely to their longitudinal axis is arranged in a not illustrated machine frame. The receiving troughs 2 are provided with an entraining shoulder 3, which projects up from a bottom surface 4 of the troughs 2 and forms a laterally directed and open prismatic cross-section, the opening dimension of which becomes smaller towards one end of the receiving trough 2. The broader end 5 of the receiving troughs 2 is guided past a decapitating tool 6, which comprises a pair of circular knives 7 approaching each other closely and arranged inclined to each other. The end of the entraining shoulder 3 is adapted to the angle of the circular knives 7 opening towards the receiving troughs. The circular knives 7 are borne by a housing 8 and driven in suitable manner to be rotating in an opposite sense to each other, the housing 8 being mounted to be pivotable around a pivot axle 9 arranged parallel to the conveying direction of the receiving troughs 2 and essentially in the plane of their bottom surfaces 4. Disposed on the housing 8 there is a pair of feeler rails 10, which are constructed in the manner of skids and mounted to be pivotable synchronously in opposite sense to each other immediately beside the surfaces of the circular knives 7 remote from the receiving troughs 2 and in their planes around axles 11 and 12 parallel to the pivot axle 9. The feeler rails 10 are retained in their narrow setting by the force of a tension spring 13. The spacing of the circular knives 7 from the ends of the entraining shoulder 3 facing them is arranged to be settable by a corresponding mounting of pivot bearings 14 carrying the pivot axle 9. The receiving troughs 2 are accompanied at their side facing the decapitating tool 6 by a row of spikes 15, the respective spacings of which correspond to the pitch of the trough chain 1. It is the object of the spikes 15 to locate the fish to be processed in its eye cavity.

The mode of operation of the apparatus is as follows:

A fish, which is placed on the bottom surface 4 of a receiving trough 2 of the trough chain 1 with the back towards the entraining shoulder 3, subject to location by its eye cavity by means of a spike 15, is conducted towards the decapitating tool 6. Shortly before arrival at the same, the fish enters between the pair of skid-shaped feeler rails 10, which are urged apart by the fish body. In consequence of the mounting of the feeler rails 10 and the mutual synchronisation, the housing 8 carrying the circular knives 7 of the decapitating tool 6 are pivoted along in dependence on the respective thickness of the fish in such a manner that the contact point of circular knives 7 is each time brought into the plane of symmetry of the fish and the wedge-shaped decapitating cut extends exactly in this.

The spikes 15 can be fastened in a known manner on a separate chain and for the purpose of obtaining the neck flesh rotate delayed relative to the mould chain 1, but they can, however, also run along synchronously displaced so that already on the introduction of the fish, the head thereof is located in the neck position. In both cases, a known per se mounting 16 is required in each receiving trough 2, which mounting is driven out by controlling, in the receiving trough respectively to be loaded and freed only shortly before reaching the decapitating tool 6 so that the fish is supported by spring force from the belly side.

In a further embodiment, the spacing of each spike 15 from the decapitating tool 6 can be controlled from the respective setting of the feeler rails 10. The latter can then also be mounted in such a manner that their pivot plane extends perpendicularly to the plane of symmetry of the decapitating tool 6.

Figure 2:
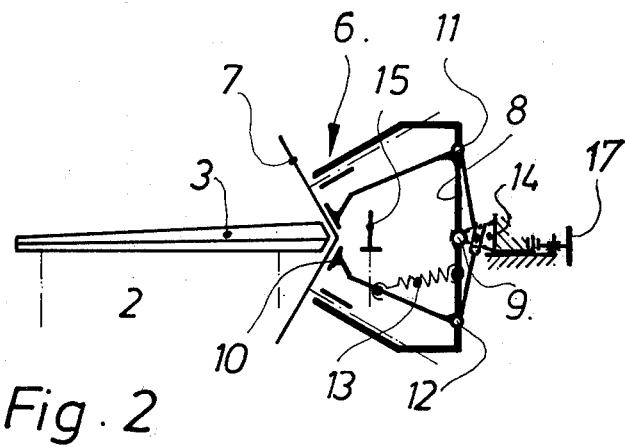
FIG. 2 is a cross-section through the apparatus in the region of the decapitating tool.

For setting the spacing of the circular knives 7 from the ends of the entraining shoulder 3 facing them the pivot bearings 14 carrying the pivot axle 9 are associated with setting means 17 depicted in FIG. 2. These setting means may be acted upon either manually or mechanically and allow the mounting 14 to be shifted either to the left or to the right to change, i.e., increase or reduce said space.

What we claim as our invention and seek to secure by Letters Patent is:

1. Apparatus for mechanically decapitating fish, said fish having a head end, a tail end, two sides opposing each other intermediate said head end and said tail end, and a longitudinal axis extending between said head end and said tail end, said apparatus including
   a. conveying means for conveying said fish in a conveying direction and defining a conveying plane, comprising a trough chain of receiving troughs having two end portions and a bottom surface to receive and convey said fish lying on one of said sides with their longitudinal axis essentially transverse to said conveying direction, and
   b. decapitating means arranged at a close spacing beside one of said end portions of said receiving troughs and comprising pairwise arranged rotatingly driven circular knife means and feeler rail means, wherein said knife means are arranged symmetrically with respect to each other, including an angle with each other and being aligned by their plane of symmetry to be nearly parallel to the plane of said bottom surface of said receiving troughs whereby to provide a wedge-shaped cut through said fish, said feeler rail means being arranged symmetrically to the plane of symmetry of said knife means and displaceable synchronously by said fish against the force of spring means, and said knife means being mounted displaceably in height and operatively coupled with said feeler rail means for movement of said knife means in response to displacement of said feeler rail means to reposition said plane of symmetry of said knife means relative to said plane of the bottom surface of said receiving troughs by a distance sufficient to locate the juncture of said angularly-arranged knife means exactly at the longitudinal axis of the fish displacing said feeler rail means, regardless of the size of said fish.

2. Apparatus as claimed in claim 1, wherein said decapitating means is mounted to be pivotable around a pivotable axle, which is disposed essentially in said plane of symmetry of said knife means and arranged essentially parallel to the plane of said knife means.

3. Apparatus as claimed in claim 1 wherein said bottom surfaces of said receiving troughs are arranged in such a manner that they are inclined upwardly in said conveying direction relative to said conveying plane.

4. Apparatus as claimed in any one of claims 1 to 3 wherein said spacing between said decapitating means and said end of said receiving troughs is settable.

* * * * *